(12) United States Patent
Reijer Picozzi

(10) Patent No.: US 11,072,552 B2
(45) Date of Patent: Jul. 27, 2021

(54) SLUDGE DEHYDRATOR

(71) Applicant: Augusto Eric Reijer Picozzi, Region de Valparaiso (CL)

(72) Inventor: Augusto Eric Reijer Picozzi, Region de Valparaiso (CL)

( * ) Notice: Subject to any disclaimer, the term of this patent is extended or adjusted under 35 U.S.C. 154(b) by 304 days.

(21) Appl. No.: 15/768,521

(22) PCT Filed: Jun. 28, 2016

(86) PCT No.: PCT/CL2016/000033
§ 371 (c)(1),
(2) Date: Sep. 11, 2018

(87) PCT Pub. No.: WO2017/066891
PCT Pub. Date: Apr. 27, 2017

(65) Prior Publication Data
US 2019/0010071 A1    Jan. 10, 2019

(30) Foreign Application Priority Data

Oct. 20, 2015  (CL) .................................. 3095-2015

(51) Int. Cl.
*C02F 11/12* (2019.01)
*B01D 21/00* (2006.01)
(Continued)

(52) U.S. Cl.
CPC ........ *C02F 11/121* (2013.01); *B01D 21/0012* (2013.01); *B01D 21/10* (2013.01);
(Continued)

(58) Field of Classification Search
CPC ............... B01D 21/0012; B01D 21/10; B01D 21/2405; B01D 21/2444; B01D 21/2494;
(Continued)

(56) References Cited

U.S. PATENT DOCUMENTS 4,859,332 A * 8/1989 Johnson ................. B01D 29/39
210/332

FOREIGN PATENT DOCUMENTS

JP      2002331230 A  * 11/2002
JP      2006281031 A  * 10/2006

* cited by examiner

*Primary Examiner* — Dirk R Bass
(74) *Attorney, Agent, or Firm* — Svendsen Legal, LLC

(57) ABSTRACT

The "sludge dehydrator" equipment is a machine that permits to remove low turbidity water from sludge or watery pastes of industrial or mining origin, with the following objectives:
  To optimize ore recovery processes such as flotation by means of an increase of the sludge density;
  To thicken sludge or watery pastes for optimizing the filtering and drying processes, as well as to dispose of mining tailings;
  To concentrate and dispose of solids in suspension and to recover and recycle clean or clarified water.
The "sludge dehydrator" equipment has been designed on the basis of a rectangular tank provided with the necessary infrastructure for containing inside a series of suction plates being connected to a vacuum system, through which the process of solid-liquid separation is carried out and, on the other hand, to contain the cleaning mechanism—the cleaning car—with its motor system made up by pneumatic or hydraulic components required to clean suction plates the filtering medium and to keep them permanently operative. In accordance with the "sludge dehydrator" feeding and the design of the lower or bottom cone of the rectangular tank will benefit to be derived from the industrial and mining operation.

20 Claims, 11 Drawing Sheets

(51) Int. Cl.
| | |
|---|---|
| *B01D 21/02* | (2006.01) |
| *B01D 21/24* | (2006.01) |
| *B01D 21/30* | (2006.01) |
| *B01D 29/05* | (2006.01) |
| *B01D 29/64* | (2006.01) |
| *B01D 29/52* | (2006.01) |
| *B01D 63/08* | (2006.01) |
| *B01D 65/02* | (2006.01) |
| *B01D 29/60* | (2006.01) |
| *C02F 11/121* | (2019.01) |
| *B01D 29/15* | (2006.01) |
| *C02F 1/00* | (2006.01) |
| *C02F 1/24* | (2006.01) |
| *C02F 103/10* | (2006.01) |

(52) U.S. Cl.
CPC ..... *B01D 21/2405* (2013.01); *B01D 21/2444* (2013.01); *B01D 21/2494* (2013.01); *B01D 21/30* (2013.01); *B01D 21/302* (2013.01); *B01D 29/05* (2013.01); *B01D 29/15* (2013.01); *B01D 29/52* (2013.01); *B01D 29/605* (2013.01); *B01D 29/6423* (2013.01); *B01D 29/6484* (2013.01); *B01D 63/08* (2013.01); *B01D 65/02* (2013.01); *C02F 1/008* (2013.01); *B01D 2201/0415* (2013.01); *B01D 2201/16* (2013.01); *B01D 2201/34* (2013.01); *B01D 2221/04* (2013.01); *B01D 2313/04* (2013.01); *B01D 2313/06* (2013.01); *B01D 2313/16* (2013.01); *B01D 2315/06* (2013.01); *B01D 2317/04* (2013.01); *B01D 2321/30* (2013.01); *C02F 1/24* (2013.01); *C02F 2001/007* (2013.01); *C02F 2103/10* (2013.01); *C02F 2201/005* (2013.01); *C02F 2209/40* (2013.01); *C02F 2209/42* (2013.01); *C02F 2303/16* (2013.01)

(58) Field of Classification Search
CPC .................. B01D 21/30; B01D 21/302; B01D 2201/0415; B01D 2201/16; B01D 2201/34; B01D 2221/04; B01D 2313/04; B01D 2313/06; B01D 2313/16; B01D 2315/06; B01D 2317/04; B01D 2321/30; B01D 29/05; B01D 29/15; B01D 29/52; B01D 29/605; B01D 29/6423; B01D 29/6484; B01D 63/08; B01D 65/02; C02F 11/121; C02F 1/008; C02F 1/24; C02F 2001/007; C02F 2103/10; C02F 2201/005; C02F 2209/40; C02F 2209/42; C02F 2303/16
See application file for complete search history.

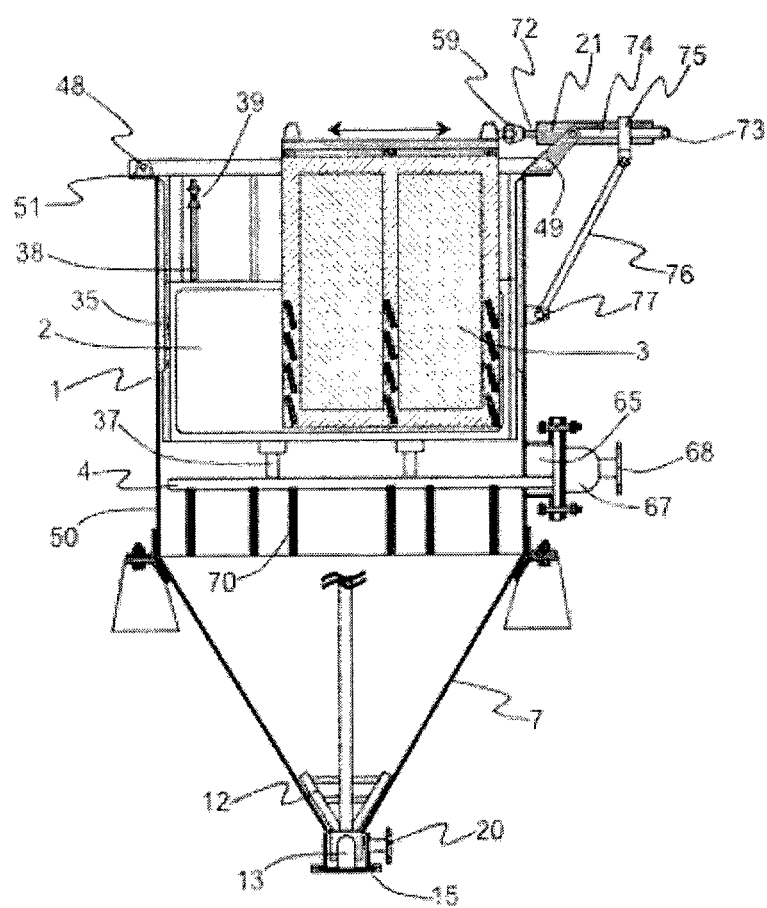
Figura 1

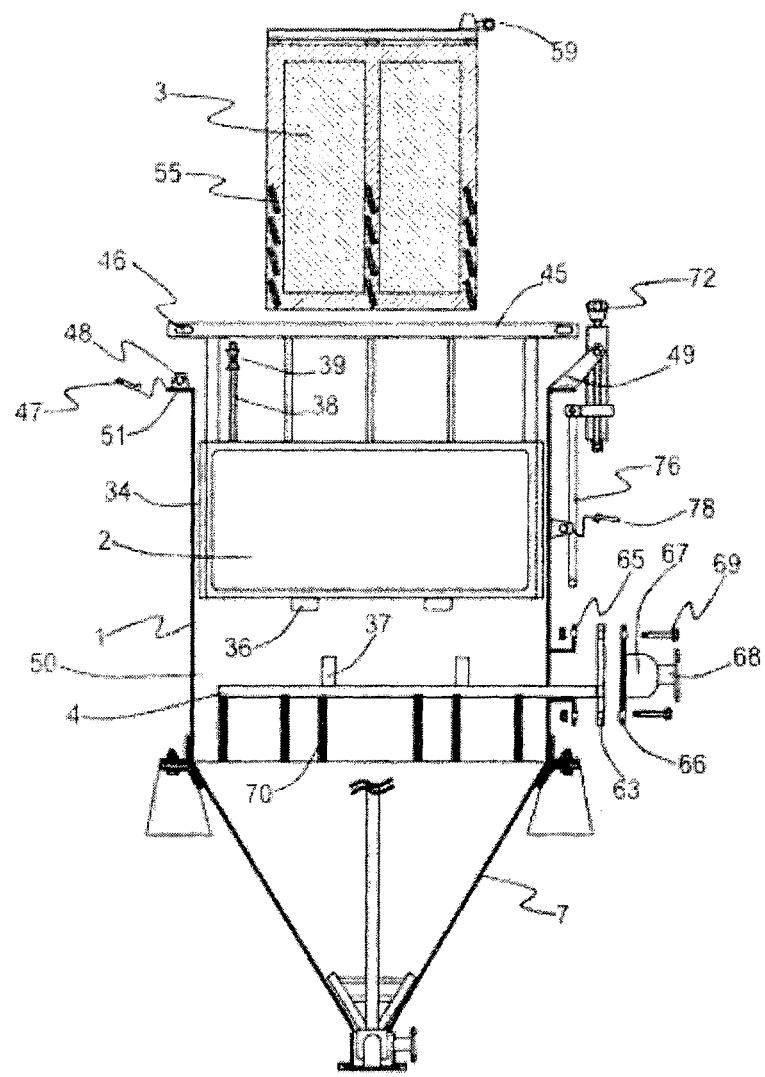
Figura 2

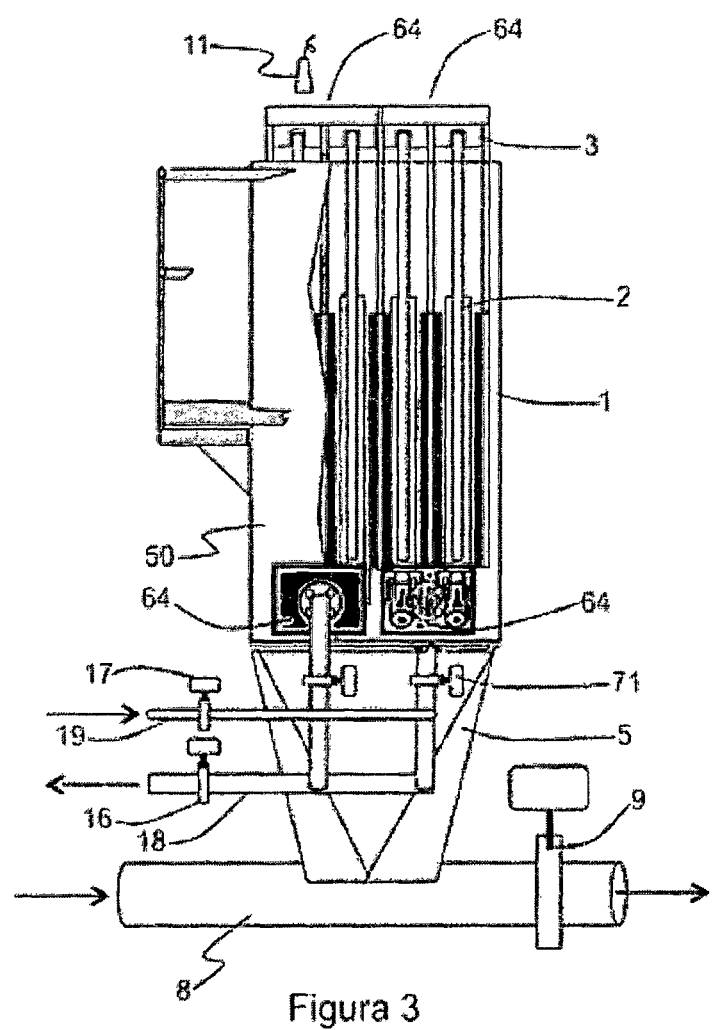
Figura 3

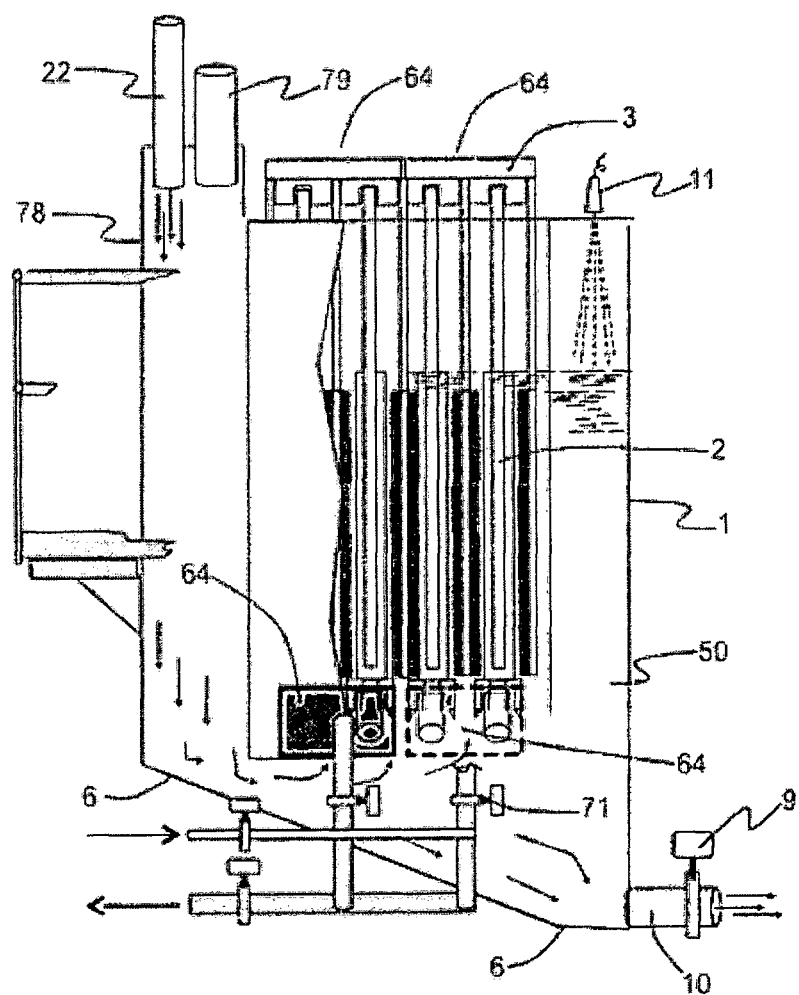
Figura 4

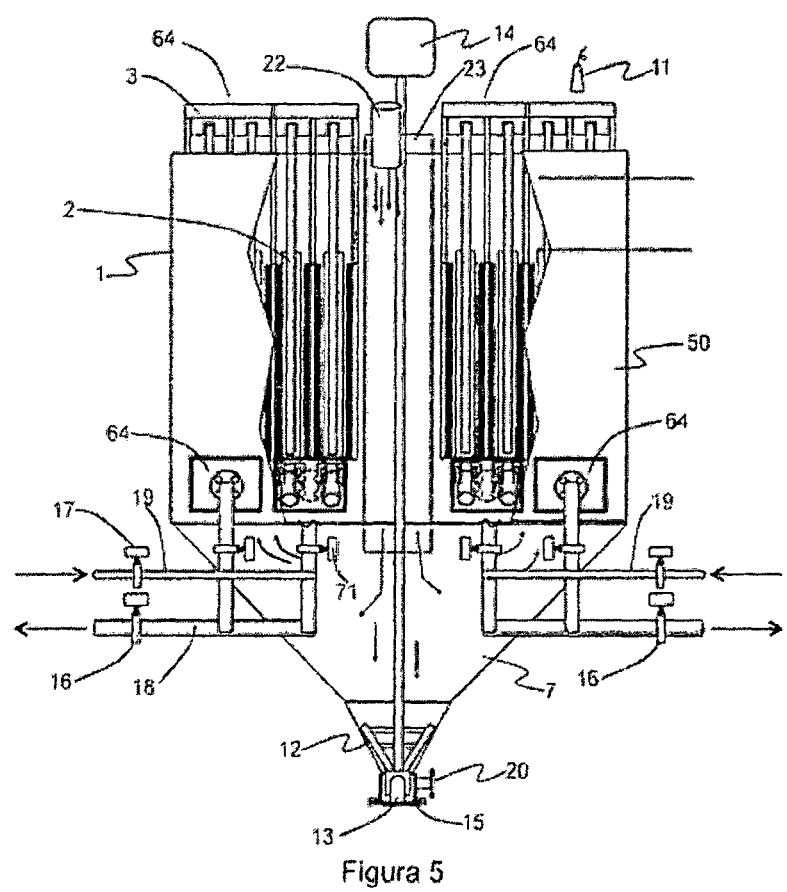
Figura 5

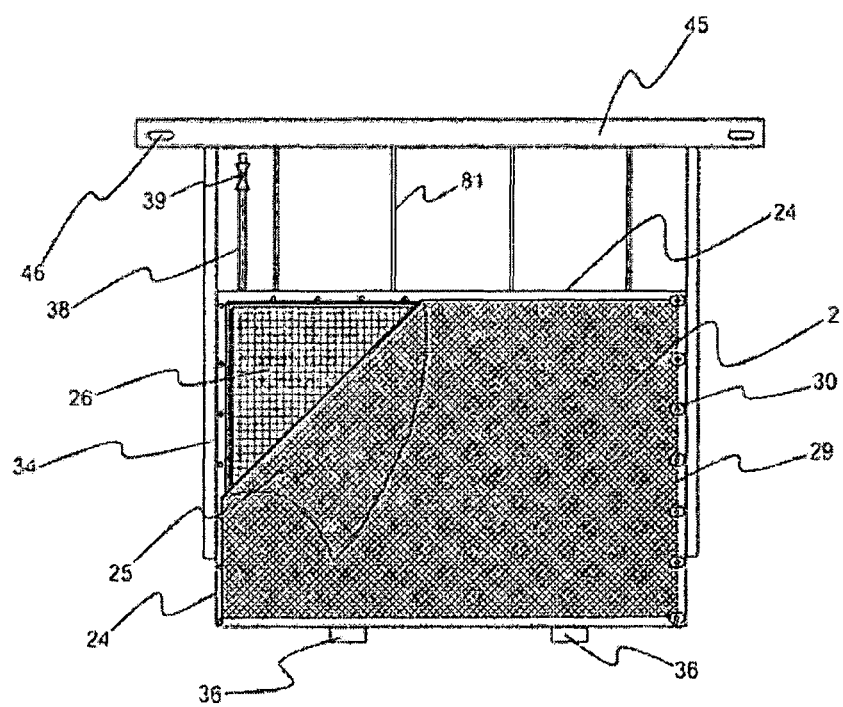
Figura 6

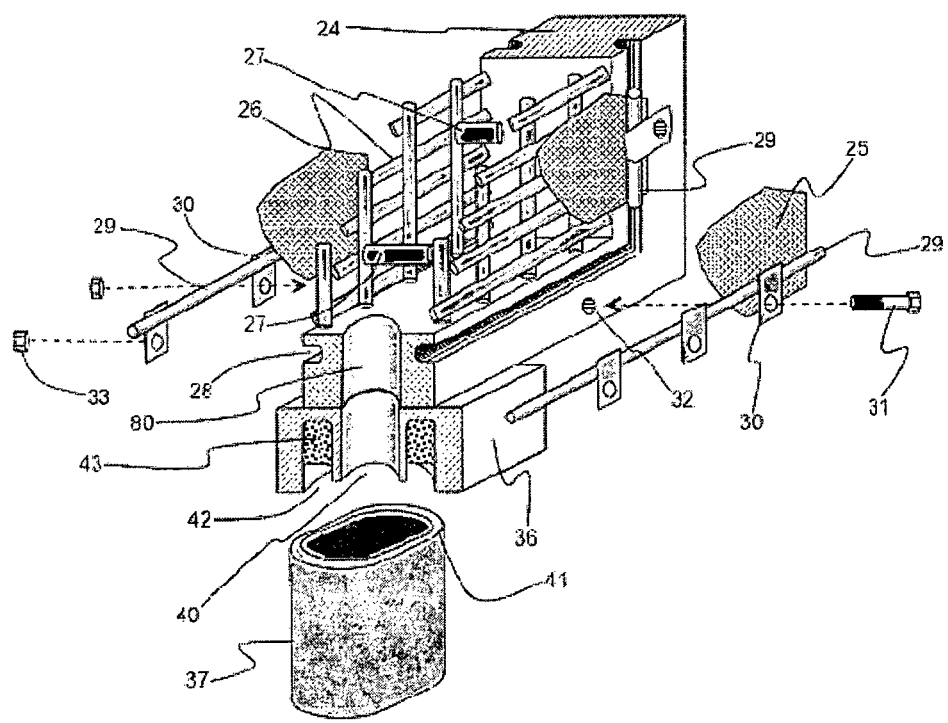
Figura 7

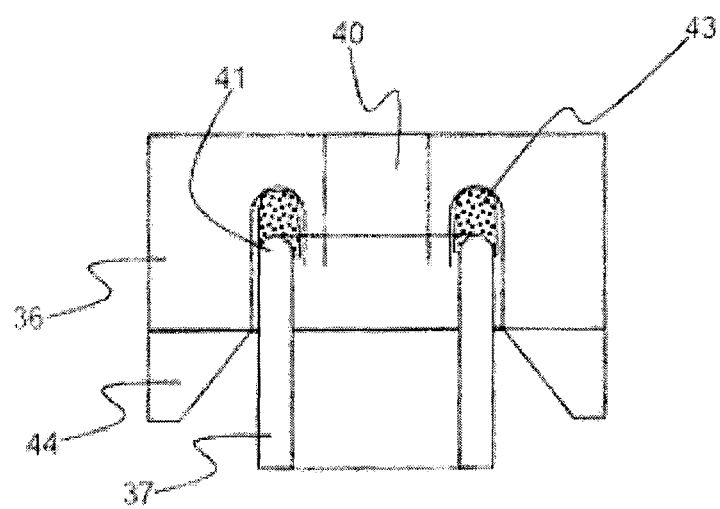
Figura 8

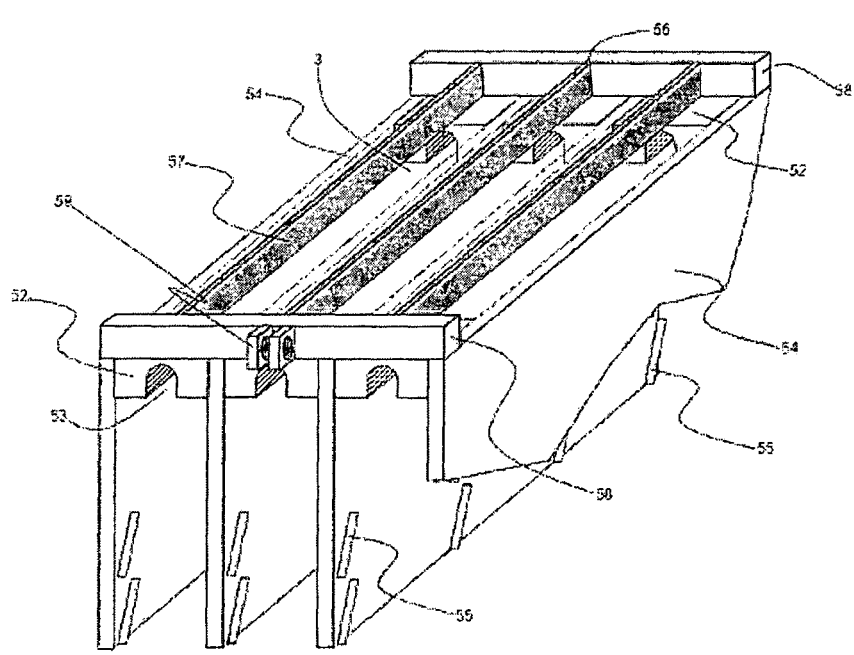
Figura 9

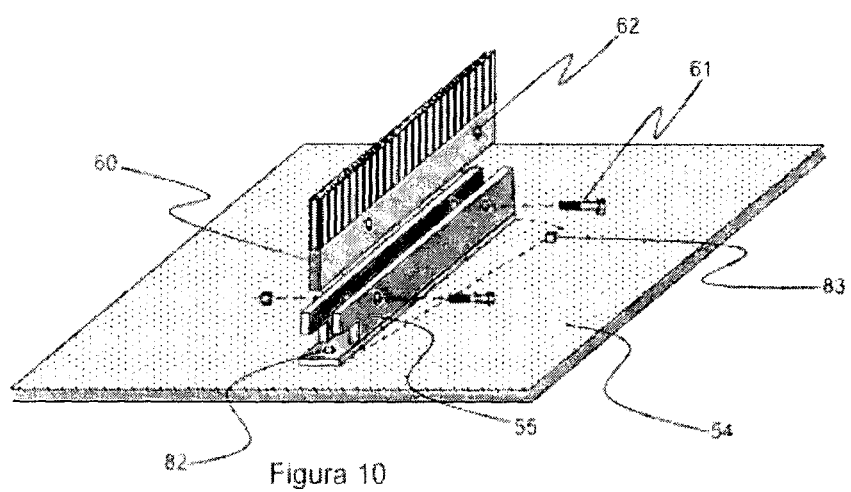
Figura 10

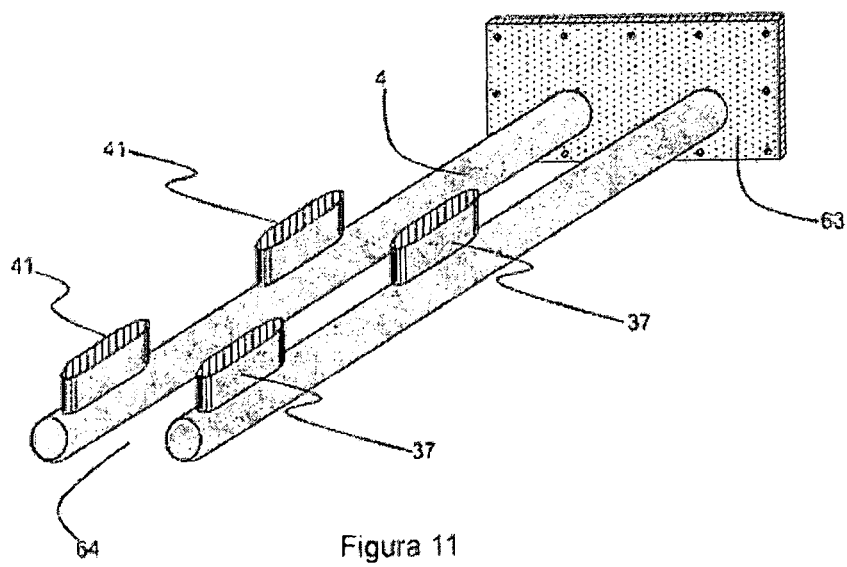
Figura 11

SLUDGE DEHYDRATOR

BACKGROUND OF THE INVENTION

The invention concerns a machine designed for removing water from sludge or watery pastes and also to clarify water being necessary works in the mining works. The machine that is the subject matter of the invention removes water from sludge or slime including a negligible quantity of suspended solids as compared to the original content, thereby increasing the density of the sludge material and consequently reducing its volume. The water removal process from sludge or watery pastes is very useful in mining operations and also in other diverse industrial activities. Thus, the industrial benefit generated by the invention denominated "Sludge Dehydrator" is wide and preferably applied to several mining works, such as for example:

i) Water removal from ore sent to flotation, wherein two important benefits are obtained, namely, first the increase of the pulp or watery paste density of the ore will have a smaller volume of extracted water and consequently, it will increase the residence time in the primary flotation stage, thereby benefitting metallurgical recovery of valuable metal; in other words, a production increases and secondly, a substantial water saving is generated by directly recycling the previous size separation process performed by the hydrocyclons in the grinding stage.

ii) Dehydrating the concentrates that pass from the cleaning flotation to a the subsequent deeper cleaning process, where benefits are obtained in both the metallurgical recovery and the higher concentration or purity of the metal concentrate produced being caused by the longer residence time in the cleaning cells because of the smaller pulp or watery paste treated and therefore, a secondary benefit results from the water and reagents saving as an effect of the recycling possibility.

iii) Treatment of industrial water containing solids in suspension from mining or industrial processes for recovery of the clarified water and disposal of solid recovered for recycling or discard.

iv) Washing operations of pulps and watery pastes from metallic concentrates in order to to reuse or to eliminate the residual reagent.

v) Thickening or density increase process for sludge, pulps or watery pastes of metallic concentrates as a conditioning step for filtration or in other cases for obtaining tailings in paste form, which involves the benefit of optimizing the recovered or recycled water.

vi) Removal of exhausted liquid reagent as a result of the chemical reactions with mixtures of solid liquid reagents.

Every industrial benefit is achieved as a consequence of an improvement in the operation design and technique involving the submerged filter proposed in the Chilean Patent No. 44,264, which redesigns the suction plate in order to work with the new cleaning system through the filtration membrane; also the tank structure is adapted for work in this set by designing a lower cone geometry and a characteristics feeding system for each type of the intended resulting benefit. In this way the "sludge dehydrator" equipment being the subject matter of the invention.

This substantial improvement of the submerged filter obeys to the fact that in its original system, cleaning of the filtration membrane is performed by injected air in counter-current to the suction, whereby the filter cloth is inflated. The disadvantage of this system consists in that due to the gravity and air density of the liquid vis-à-vis the water or liquid; the air tends to get out through the upper part of the submerged filter and generates a short circuit; over half of the cloth or filtering membrane area remains without detaching the excess solid matter adhered thereto and therefore reduces the equipment treatment capacity. Added to this problem, after the cleaning process the submerged filter is full of air and once the suction system works again it loses it operational capacity and operation time for extracting the trapped air; moreover, the cloth positioning design should have a structure that is capable to bear the internal pressure generated during the blowing process in order to avoid its detachment. On the other hand, the sludge or modified submerged filter cleans the filtrating cloth or membrane with a scraper and previously stops the suction and slightly increases the internal pressure, making it equal to the external pressure in order to change the surface of the cloth and release the adhered solid. This innovation permits to operate with the thicker sludge or watery pastes and thus expand its field of application.

Accordingly, the "sludge dehydrator" invention will thus be a machine whose main component is a new submerged filter model having a greater treatment capacity, that consists in a suction plate and a cleaning car which contribute to a series of improvements as compared to the original submerged filter, coupled to the new specific design of the tank where it is inserted.

Description of Known Aspects on the Matter

The industrial operations intended to increase the mineralized sludge density and the operations for clarifying turbid water having solids in suspension or themere increase of the percent concentration of solids or watery pastes are characteristic and essential processes in all ore reduction works, as well as in diverse industrial processes. These operations are normally performed by applying the technique of existing equipment listed below.

The thickener is a characteristic mining industry equipment, used to increase the sludge or watery pastes density in concentrators or tailings; it also performs the operations of water recovery and clarification. The design requirements include the availability of large installation areas as compared with the remaining process equipment. They perform the solid-liquid separation through natural settling of the solids, generally by accelerating the precipitation with flocculants or coagulants.

Although centrifugal machinery can achieve a good separation between phases, the equipment evidences a certain mechanic sophistication which raises their cost and requires more exhaustive maintenance. They perform the solid-liquid separation through the generation of centrifugal force.

It should be underscored that the submerged filter (Chilean Patent No. 44264), whose industrial advantage is to clarify industrial water and concentrate the solid by delivering it as a sludge or watery paste with a greater density than the same was initially fed.

The polishing filter consists of some cloth sleeves included in a vessel or container supplied with pressurized turbid water; the cloth retains the solid and clarifies the water with a view to extracting the accumulated solids excess, the clarification or polishing of the liquid process. Likewise, backwashing with water and dilution of the solid pulp should be undertaken by diluting the solid in the pulp. A similar operation is performed with sand filters.

BRIEF DESCRIPTION OF THE FIGURES

For a better explanation of the "sludge dehydrator" invention, a description is found below in relation to a preferred execution in relation to the following figures, where FIG. 1 is a cross section side view of the "sludge dehydrator" equipment, which shows a suction plate connected to a suction pipe being connected with a cleaning car mounted on the track rail and the equipping required for an industrial operation.

FIG. 2 is a cross-section side view of the "sludge dehydrator" equipment, with all its components, parts or pieces being under installation or dismantling.

FIG. 3 is a cross-section side view of the "sludge dehydrator" equipment including the lower cone design of the tank being adapted to dehydrate sludge or watery pastes, preferably in a mining process, such as those undergoing the grinding to process to primary flotation.

FIG. 4 is a cross-section view of the "sludge dehydrator" equipment having the lower cone design of the tank adapted to dehydrate sludge or watery pastes, preferably in mining processes as those passing from a flotation cleaning stage to a cleaning stage.

FIG. 5 shows a cross-section view of the "sludge dehydrator" equipment having the lower cone design of the tank adapted to dehydrate sludge or watery pastes, preferably in mining processes, such as the thickening of concentrates or tailings from water that originates in diverse works water clarification.

FIG. 6 is a side view of a suction plate.

FIG. 7 is a tridimensional cross-section view of the suction plate.

FIG. 8 is a cross-section side view in detail of the connection and sealing of a suction plate with the suction pipe.

FIG. 9 shows a tridimensional view of a cleaning car.

FIG. 10 shows a tridimensional view of the installation system of brushers or in the cleaning car.

FIG. 11 shows a tridimensional view of a set of a suction pipes set.

DESCRIPTION OF THE INVENTION

With reference to FIGS. 1 and 2, the "sludge dehydrator" invention (1) consists of an equipment for extracting portions of clarified or partially clarified water from sludge or watery pastes, as well as from turbid water having substantial contents of solids in suspension, in all cases by increasing the density of the muddy material or watery paste. The mechanism for removing the clarified or partially clarified water is carried out with a modified submerged filter, which reaches a high capacity vis-à-vis that of the original Chilean Patent No. 44,264; in this way the dehydrated sludge is settled, concentrated and discharged through the lower cone of the "sludge dehydrator" (1).

The modified submerged filter consists of the set made up by a suction plate (2) and a cleaning car (3). The suction plate (2) is connected to the suction pipe (4) that extracts the absorbed water; the solids are retained in the filtering cloth or membrane (25); the cleaning car (3) is moved and the brushers or scrapers (60) detach the solids being adhered thereto and settle them into the bottom.

The sludge dehydrator (1) being the subject matter of the invention has a particular design in the lower part of the rectangular tank (50), which is characteristic for each type of function required to be obtained. Accordingly, With reference to FIG. 3, as concerns the industrial activity, to dehydrate sludge or watery pastes, for example mineralized sludge is fed to an ore flotation process from the grinding process. Through this operation, it is possible to reach an optimum flotation density by lowering the volume of treated ore paste, which implies a longer residence time in the flotation cells, thus benefitting the recovery of treated ore. In order to proceed to this industrial activity, the design of the lower part of the rectangular tank (50) of the sludge dehydrator (1), a feeding cone and tubular discharge (5) is inserted in the process piping (8) which transports the watery pastes from the grinding process into the flotation process. Located in the exit end a control valve (9) is provided for the automatic operation, whose object is to produce inside the sludge dehydrator (1) a liquid level such that it maintains submerged the suction plate (2) destined to the permanent and continuous water suction thereby increasing the density and concentration of solids in the sludge or watery paste discharged through the control valve (9), whose opening or pitch is in turn controlled by a level sensor (11). The clarified or partially clarified being removed from the ore watery paste removed from the ore can be immediately recycled in the grinding addition point, thus contributing another important industrial benefit from the water recovery and recycling.

In the cleaning operation the filter cloth or membrane (25) is designed according to a computer program prepared on experimental basis, where for every given operation time of the sludge dehydrator (1) the suction valve (16) will be closed; and then the atmospheric pressure valve (17) will be opened and immediately closed and will release the cloth or filtering membrane (25) in order to detach the adhered sludge which due to agglomeration will accelerate its settling into the feeding cone and the tubular evacuation (5).

With reference to FIG. 4, regarding the industrial activity, the sludge or watery pastes dehydrator, e.g. in concentrates obtained from the primary flotation to be sent to cleaning flotation—which generally over-hydrates them due to the freshwater that causes fresh water foam. Upon dehydration, the concentrates will increase their density, reduce their volume and have a longer residence time in the flotation cells, thus achieving a better purity and increasing the recovery. For taking care of this industrial activity, in the rectangular tank (50) lower portion of the sludge dehydrator (1) a sludge receiver and discharge cone (6) has been designed. The concentrate or sludge are supplied by the upper feeding pipe (22) connected to a side receiver closed case (78), provided with a chimney (79) for gas evacuation and for minimizing the formation of foam in the rectangular tank (50). This equipment also operates as the already known transfer cases, which are dispatch stations being stations for sending concentrate from one flotation circuit to another, the lower exit duct (10) is provided with a control valve (9) commanded by the level sensor (11); this valve and level set will remain submerged with the suction plate (2). It is possible to provide a pump located before the lower exit duct (10) in order to remove and send the dehydrated concentrate to another flotation circuit.

The cloth or filtering membrane (25) in the cleaning process is designed according to an experimental computer program, where every given operation time of the sludge dehydrator (1); the suction valve (16) will be closed, and the atmospheric pressure valve will be immediately opened and closed (17) and will loosen the filter cloth or membrane (25) so as to remove the adhered sludge and at once the piston (21) actuates and moves the cleaning car (3) in order to remove the sludge which because of its agglomeration will accelerate the settling into the receiver cone and sludge discharge (6).

With reference to FIGS. 1 and 5, that concern an industrial activity, e.g. to thicken and condition the metallic concentrate obtained in the final flotation cleaning to be filtered and dried for marketing and for sending it to ore processing (locally known as "maquila"). This industrial process is performed by applying the design of the sludge dehydrator (1) lower part with a thickening cone (7). As in this case, the settled sludge or ore paste should be as dense as possible, a drag (12) has been included, which is moved by a motor-reducer (14) with a view to avoiding a silt deposit and to maintain the thick concentrate fluidity under evacuation through the sludge discharge (20). The drag lower part (12) is connected in concentrator (13) of the bottom cover (15).

The sludge or watery paste is fed to the sludge dehydrator (1) preferably by an upper feeding duct (22) that discharges into the central bin or case (23) in communication with the upper part of the thickening cone (7).

The cleaning process of the filtering cloth or membrane (25) is designed according to an experimental computer program. Here, every given time the operation of the sludge dehydrator (1) will close the suction valve (16) then open and immediately close the atmospheric pressure valve (17) in order to detach the filtering cloth or membrane (25) from the rack (26) and will release the adhered sludge; then the piston (21) operates by moving the cleaning car (3) to remove the adhered sludge that because of its agglomerating action accelerates its settling into the thickening cone (7).

With reference again to FIGS. 1 and 5, for industrial activity, turbid water having substantial contents of solids in suspension is clarified and the most dense solids are disposed for recovery or conditioned for discard, a process that is performed by means of the design of the lower part of the sludge dehydrator (1) of a thickening cone (7) and operating the equipment for treatment of a highly diluted sludge; for this reason in the industrial operation it is possible to do without the drag (12). The produced clarified water volume of flow should always be higher than the turbid water volume of flow; otherwise the equipment will overflow due to its lack of capacity. The equipment includes a level sensor (11) to control its filling capacity, bearing in mind that since the clarified water volume of flow is greater than the feeding capacity, the level should always go down in order to avoid the suction plate (2) cropping out, which should be always submerged; the water suction will be stopped by closing the suction valve (16) connected to the vacuum line (18); when this situation is present, the equipment low level will start recovering its level due to the continuing feeding of turbid water. In this case a cleaning cycle can be performed to be first performed by an instantaneous opening and closing of the atmospheric pressure valve (17) being connected to a pressurized water or air line (19) preferably at the atmospheric pressure, in order to release the filter cloth or membrane (25) and breaking the adherence of the solid material; in the third place, at this same instant the piston (20) will be operated to move the cleaning car (3) and detach the adhered sediment which due to its concentration will be settled into the cone (7) bottom.

With reference to FIGS. 6 and 8, together with the cleaning car (3) the suction plate (2) forms part of the modified submerged filter body, whose function is to separate or remove the sludge or watery paste water; its shape is similar to that of the submerged filter described in the Chilean Patent No. 44264, and also to the shape of the disc filter plate known in the technique. Accordingly, for its operation the known procedure is applied that consists of generating a vacuum inside the suction plate (2) together with a pressure differential between the outside and the inside, which activates the water transit through the filter cloth or membrane (25) into the inside and maintains the solid material outside. With a view to maintaining the rigidity of the filtering cloth or membrane (25) on each side, and to avoid their being united, an internal rack (26) is provided inside for each face, being joined with the opposite face by union pillars (27) in a sufficient number to resist the pressure exerted by the vacuum in the course of the suction operation. The internal rack (26) as a whole remains fitted in the frame (24), whose design provides a channel (28) along its entire perimeter, destined to introduce the filtering cloth or membrane (25) with the countersunk bars (29), preferably having a circular section provided with welded washers (30); a bolt (31) is passed through them that crosses the frame (24) through the cylindrical opening (32) and receives in the opposite side the other washer (30) to place the nut (33), which is then tightened and the countersunk bar (29) starts to be introduced in the channel (28), whereby the filtering cloth or membrane (25) is installed at both sides.

With reference to FIGS. 2, 7 and 8, with a view to producing a sound seal between the suction nozzle (36) and the female connector (37), the design provides a distance between the seal channel bottom (42) whose length should be less than the existing distance between the upper flange (51) of the rectangular tank (50) and the rounded edge (41) of the female connector (37). Bearing in mind that the difference between the two distances or measures should be smaller at the sponge seal location (43) in order to leave duly installed the suction plate (2), a tightening of the sponge seal (43) is produced in order to ensure said sealing. The rail bar contemplates a fastening boring (46) In both ends so as to ensure it with a retainer pin (47) that traps the rail bar (45) between two smaller fixation lugs (48) being integral with the upper flange (51).

With reference to FIGS. 1, 2 and 6, in order to facilitate the installation or removal of the suction plate (2), an air duct (38) is provided to let the air go out and to avoid that it floats during its installation so that the air gets in and the liquid found inside gets out when it is removed, thereby preventing excessive weight. When the equipment starts-up; the air valve (39) closes the air duct (38). The rail bar (45) operates to support and permit the cleaning car (3) displacement; it is also used to perform engagement operations required for introducing to or removing the suction plate (2) from the sludge dehydrator equipment (1). It is provided with supporting pillars (81) that join the rail bar (45) with frame (24); the guiding blade (34) carries out a similar function as the supporting pillars (81).

With reference to FIGS. 7 and 8, in order to produce a good sealing, the design of the suction nozzle (36) provides a male connector tube (40) being surrounded by the seal channel (42) where it is countersunk by a sponge seal (43) having a same shape but a greater thickness, so that it remains trapped.

The frame (24) located in the lower portion provides the discharge of clarified water with two openings (80) of rectangular shape having semicircular ends in order to minimize the load loss being faced to a circular shape. The male connector (40) will have the same form of the opening (80), that will perfectly coincide upon installation in the suction nozzle (36) located in frame 24).

The rectangular shape having extremely semi-cylindrical ends has been considered for the opening (80) as well as that of the male connector (40) in order to use only two suction nozzles (36) in the design of the suction plate (2) and thus ensure a homogeneous contact seal with the female connector (37) of suction pipe (4).

The suction nozzle (36) has in its lower edge a funnel sole (44) and said funnel shape permits to guide the suction plate (2) upon its contact with the suction pipe (4) and achieve an optimum match of the female connector (37) and the sponge seal (43) and to facilitate the slipping, a rounded edge (41) has been designed.

The sole function (44) also performs a function as a wear element when transfer operations are carried out for transfers are performed with the suction plate (2) during the maintenance work, whereby it is transferring drag, being preferably designed with high-density polyethylene as the construction material.

With reference to FIGS. 1, 2, 9 and 10, jointly with the suction plate (2) the cleaning car (3) is part of the modified submerged filter body and its function is to extract the solid being adhered to the filtering cloth or membrane (25) and leave same quite clean with a view to recover and maintain a maximum suction capacity. The design includes the saddles (52) with a contact tunnel (53) having the same shape and but in reverse position in respect to the rail bar (45) to permit an optimum contact between both pieces. Along the saddles (52) sides the cleaning scrapers (54) hang along each side of the cleaning blades (54) having supporting plates (55) adhered thereto for the brushers or scrapers (60). The whole set is tied to the drag structure (56) being mainly formed by thrust longitudinal beams (57) and two transversal beams (58) that produce the thrust (57) and two transversal beams (58) for exerting the thrust by means of piston (21) connecting the thrust hook (59).

The supporting plates (55) include scraper or brushes (60) being installed with pins (61); these can be bolts, rivets or another known element, which pass through the tie openings (62). The supporting plates (55) are adhered to the cleaning blade (54) by means of an axle pin (82) located in their upper part, which connects to another supporting plate (55) found on the reverse side of the cleaning blade (54); thus upon operating the piston (21) by moving the cleaning car (3), the brushers or scrapers (60) will be inclined and push downwards the solid adhered to the filtering cloth or membrane (25); the butt (83) will restrict the inclination angle of the supporting plate.

The supporting plates (55) are installed in a column in the cleaning blade (54), in a sufficient number to cover the frame (24) height. The cleaning car (3) will have at least two columns made up by supporting plates (55) and at least two saddles (52) in each cleaning blade (54), mainly to provide rigidity and balance. The greater number of columns in each cleaning blade (54). The greater is the number of columns of supporting plates (54) the shorter stroke or run will have piston (21). In other words, its piston arm (72) will have a shorter length. Consequently, in the design of the cleaning car (3) the size of the cleaning car (3) and the piston size should be calculated for an optimum dimensioning of the sludge dehydrator (1) operation being the invention subject matter.

On the basis of a pre-designed electronic program for operation of the sludge dehydrator equipment (1), the cleaning car (3) is moved by piston (21), which can be located only at one side or simultaneously at both sides. With a view to perform this operation, the design provides that the piston arm end (72) be connected to the thrust hook (59) and the tail connector (73) connects the two mobile arms (74), one at each side of them being connected to a greater fastening blade (49), whose union is a rotary axle. The piston (21) is wedged inside the ring (75), being integral with or else wedged to the two mobile arms (74) which have connected in the lower part a supporting flange (76) being supported on on a tank lug (77) and ensured by means of a flange pin (78) which, for maintenance purposes is disconnected together with the thrust hook (59) thereby releasing the piston arm (72) and permitting to leave the piston (21) in vertical position. This permits to be maintained by the ring (75) and leaves a free space for removing or installing the suction plates (2) and the cleaning car (3).

With reference to FIGS. 1, 2, 7 and 11, the suction plate (2) is introduced in the sludge dehydrator (1) rectangular tank (50) and then be connected with the guiding blade (34) with the tank guide channel (35) in such a way to cause the perfecting fitting of the suction nozzle (36) with the female connector (37) of the suction pipe (4). Only two suction nozzles (36) are contemplated for each suction pipe (4), with a view to ensuring a good contact between them.

The suction pipe (4) installed in the rectangular tank (50) of the sludge dehydrator (1) should be parallel to the upper flange (51) so that upon installation the suction plate (2) produces a homogeneous seal between the suction nozzle (36) and each female connector (37); aiming to optimize this seal the design considers a single pair of both pieces. For instance, if they were three female connectors (37), one of them could be shorter or longer thus adversely affecting the sealing.

Faced to the need of counting with a high capacity sludge dehydrator (1) it is necessary to expand the area of a suction plate (2) and to avoid the increase of its width or thickness and also to avoid counting with more than two suction nozzles (36) and a female connector (37), these components are designed with a rectangular section and semi-circular ends increasing the clarified water passing area.

In order to maintain the cleaning car (3) in stable and balanced condition, at least two supporting points are required, in both longitudinal and transversal sense. Therefore the sludge dehydrator (1) is designed with at least two suction plates (2) for each sector (64) and equal number of suction pipes (4) that end up joined on the distribution tray (63). To each sector (64) a hatch with a flange (65) will be provided.

The set of suction pipes (4) that make up a sector (64) is introduced through the flanged hatch (65) resting on the supporting beams (70) that will maintain aligned and rigid the suction pipe (4) and leave on a same plane the rounded edges (41) in order to optimize the sealing. The collector lid (66) is then connected, and is provided with a conduit section (67) that collects the exits of the suction pipe (4) of the corresponding sector (64) and discharges the clarified water through the terminal (68). The collector lid (66) is tied to the flanged hatch (66) with bolts and nuts (69) leaving trapped the distribution tray (63) provided with sealing material.

The cleaning operation of the filtering cloth or membrane (2) is electronically programmed.

With reference to FIGS. 3, 4 and 5, the sludge dehydrator (1) of this invention includes in its design a system of operative units being identified by sector (64) of suction plates (2) and cleaning cars (3) that permit to leave off service the sector requiring maintenance or change of operation components, such as the filtering cloth or membrane (25), brushes or scrapers (60), piston (21) or another part or related piece. In order to isolate the selected sector (4), the terminal (68) has a maintenance valve (71) that upon its manual or electronic closing will leave out of service the selected sector (64) and the sludge dehydrator equipment (1) being the subject matter of the invention will continue operating with the remaining sectors (4) while one of then is intervened.

The invention claimed is:

1. A sludge dehydrator machine for use in a mining works to dehydrate a sludge, the sludge dehydrator machine comprising:

a sludge receiver having a tank positioned above a discharge cone, an upper sludge feed, a sludge water vacuum line, and a sludge solids discharge;

the sludge enters the sludge receiver through the upper sludge feed, a sludge water removed from the sludge receiver through the sludge water vacuum line, and a sludge solids exit the sludge receiver through the sludge solids discharge located at a discharge cone of the sludge receiver;

a suction plate having a filtering membrane, the suction plate submerged below a liquid level in the sludge receiver, the suction plate positioned within the sludge receiver to suck a sludge water through the filtering membrane under an internal vacuum to increase the density and concentration of the sludge solids within the sludge receiver;

a cleaning car having a brush to detach the sludge solids adhered to the filtering membrane and for removing the sludge solids adhered to the filtering membrane into the sludge receiver, and the cleaning car moved by a piston, the cleaning car moved to release the sludge solids adhered to the filtering membrane of the suction plate;

a drag within the sludge receiver, the drag moved by a motor-reducer, the drag moved to avoid a clogging of the sludge receiver and to maintain fluidity in the sludge solids evacuated from the sludge receiver through the sludge discharge;

the sludge solids settle into the discharge cone of the sludge receiver to the sludge solids discharge and through a solids discharge control valve, the solids discharge control valve automatically operated with connection to a level sensor, to maintain the liquid level within the sludge receiver that keeps the suction plate submerged; and the sludge water vacuum line sucks the sludge water from the sludge receiver to increase the density and concentration of the sludge solids.

2. The sludge dehydrator machine of claim 1, wherein the brush of the cleaning car is a scraper to release the sludge solids adhered to the filtering membrane.

3. The sludge dehydrator machine of claim 1, additionally wherein the level sensor that controls the filling level of the sludge receiver, also closes a suction water valve connected to the sludge water vacuum line to keep the suction plate submerged within the tank.

4. The sludge dehydrator machine of claim 3, additionally wherein:

the filtering membrane is cleaned by closing the suction water valve and then opening and immediately closing an atmospheric pressure valve within the sludge receiver to detach the filtering membrane from an internal grill, to then release the solid sludge adhered to the filtering membrane with the suction plate including the internal grill and the filtering membrane held within the internal grill; and the piston of the cleaning car then operates to move the cleaning car and accomplish a removal of the solid sludge adhered to the filtering media with an agglomerating action of the removal of the solid sludge to accelerate settling of the solid sludge into the discharge cone of the sludge receiver.

5. The sludge dehydrator machine of claim 1, additionally wherein:

the suction plate is a first suction plate and a second suction plate comprising a suction plate pair, and the filtering membrane is a first filtering membrane and a second filtering membrane;

the first suction plate includes the first filtering membrane and the second suction plate includes the second filtering membrane; and a first internal grill within the first suction plate is joined by a connecting pillar to a second internal grill within the second suction plate, to resist the internal vacuum exerted on the suction plate pair, and to prevent the first filtering membrane from joining to the second filtering membrane.

6. The sludge dehydrator machine of claim 1, wherein the tank has a lower flow located at the discharge cone, the suction plate includes a suction nozzle located on the lower floor, and the suction nozzle connects to the sludge water vacuum line.

7. The sludge dehydrator machine of claim 6, additionally comprising:

a channel guide located within the tank, the channel guide having an upper guide part in the shape of a funnel, the channel guide located on an upper internal edge of the tank; and the channel guide guides the suction plate as the suction plate is introduced into the tank, the channel guide matches the suction nozzle to connect to the sludge water vacuum line.

8. The sludge dehydrator machine of claim 1, additionally comprising an air conduit to evacuate a trapped air out of the tank at the suction plate, and to prevent a floating of the suction plate within the tank.

9. The sludge dehydrator machine of claim 1, additionally wherein:

the cleaning car is mounted to the tank, the cleaning car coupled to a mobile arm with a pin acting as an axle, and at an opposite end of the mobile arm a tail connector is coupled to the piston at a piston tail;

a thrust hook is connected to the piston arm opposite from the piston tail, with the thrust hook attached to the cleaning car; and a ring integral with the mobile arm and located at each side of the piston, and the piston including a supporting plate that engages a tank lug, and the tank lug mounted to the tank.

10. The sludge dehydrator machine of claim 1, additionally wherein:

the cleaning car includes a mount, the mount connected to a contact tunnel, the contact tunnel having a reverse configuration relative to a rail bar, the rail bar attached to the suction plate;

the rail bar attached to the contact tunnel;

a cleaning blade pair hangs from the mount, and the cleaning blade pair including a support plate for receiving the brush; and the cleaning blade pair tied to the drag.

11. The sludge dehydrator machine of claim 10, additionally wherein:

the cleaning blade pair includes a first cleaning blade and a second cleaning blade, and the support plate attaches to the cleaning blade pair on a first blade side of the first cleaning blade, and a reverse side support plate attaches to a second blade side of the second cleaning blade;

actuation of the piston moving the cleaning car inclines the brush to push the brush downward across the filtering membrane, and to remove the solid sludge adhered to the filtering membrane; and a butt is adhered to the cleaning blade pair, the butt to limit a angle of inclination of the support plate.

12. The sludge dehydrator machine of claim 10, additionally wherein:
the cleaning car includes a first saddle and a second saddle, located at the suction plate, the first saddle and the second saddle are supported upon the rail bar and are embedded into the contact tunnel, and with the first saddle fitting into the second saddle;
the cleaning blade pair includes a first cleaning blade and a second cleaning blade, and the cleaning blade pair tied to both the first saddle and the second saddle; and
the first cleaning blade hangs along a front side of the suction plate, and the second cleaning blade hangs along a back side of the suction plate.

13. The sludge dehydrator machine of claim 10, additionally wherein:
the cleaning blade pairs are installed in a column formation with a multiple of the supporting plates covering the vertical length of the filtering membrane; and
the cleaning blade pairs are in a row formation with the multiple of the supporting plates covering the horizontal length of the filtering membrane.

14. The sludge dehydrator machine of claim 13, additionally wherein:
the cleaning blades pair has an axle pin inserted into the support plate by an axle pin located at an upper part of the support plate, and as the piston actuates to move the cleaning car the support plates move to an incline position and causes the brush to push the solid sludge adhered to the filtering membrane downwards toward the discharge cone of the sludge receiver; and
the incline position of the support plates produces an optimum inclination angle of the brush, and the optimum inclination angle additionally defined by location of the butt adhered to the cleaning blade pair near a lower side of the support plate.

15. A sludge dehydrator machine for use in a mining works to dehydrate a sludge, the sludge dehydrator machine comprising:
a sludge receiver having a tank positioned above a discharge cone, an upper sludge feed, a sludge water vacuum line, and a sludge solids discharge;
the sludge enters the sludge receiver through the upper sludge feed, a sludge water removed from the sludge receiver through the sludge water vacuum line, and a sludge solids exit the sludge receiver through the sludge solids discharge located at a discharge cone of the sludge receiver;
a suction plate having a filtering membrane, the suction plate submerged below a liquid level in the sludge receiver, the suction plate positioned within the sludge receiver to suck a sludge water through the filtering membrane under an internal vacuum to increase the density and concentration of the sludge solids within the sludge receiver;
a cleaning car having a brush to detach the sludge solids adhered to the filtering membrane and for removing the sludge solids adhered to the filtering membrane into the sludge receiver, and the cleaning car moved by a piston on a rail bar, the cleaning car moved to release the sludge solids adhered to the filtering membrane of the suction plate;
the sludge solids settle into the discharge cone of the sludge receiver to the sludge solids discharge and through a solids discharge control valve, the solids discharge control valve automatically operated with connection to a level sensor, to maintain the liquid level within the sludge receiver that keeps the suction plate submerged; and
the sludge water vacuum line sucks the sludge water from the sludge receiver to increase the density and concentration of the sludge solids.

16. The sludge dehydrator machine of claim 15, additionally comprising a drag within the sludge receiver, the drag moved by a motor-reducer, the drag moved to avoid a clogging of the sludge receiver and to maintain fluidity in the sludge solids evacuated from the sludge receiver through the sludge discharge.

17. The sludge dehydrator machine of claim 15, additionally wherein:
the cleaning car is mounted to the tank, the cleaning car includes a blade mount, the cleaning car coupled to a mobile arm with a pin acting as an axle, and at an opposite end of the mobile arm a tail connector is coupled to the piston at a piston tail; and
a cleaning blade pair hangs from the blade mount, and the cleaning blade pair including a support plate for receiving the brush.

18. The sludge dehydrator machine of claim 17, additionally wherein:
the cleaning blade pair includes a first cleaning blade and a second cleaning blade, and the support plate attaches to the cleaning blade pair on a first blade side of the first cleaning blade, and a reverse side support plate attaches to a second blade side of the second cleaning blade;
actuation of the piston moving the cleaning car inclines the brush to push the brush downward across the filtering membrane, and to remove the solid sludge adhered to the filtering membrane; and
a butt is adhered to the cleaning blade pair, the butt to limit a angle of inclination of the support plate.

19. The sludge dehydrator machine of claim 17, additionally wherein:
the cleaning car includes a first saddle and a second saddle, located at the suction plate, and the first saddle and the second saddle are supported upon the rail bar;
the cleaning blade pair includes a first cleaning blade and a second cleaning blade, and the cleaning blade pair tied to both the first saddle and the second saddle; and
the first cleaning blade hangs along a front side of the suction plate, and the second cleaning blade hangs along a back side of the suction plate.

20. The sludge dehydrator machine of claim 17, additionally wherein:
the cleaning blade pair has an axle pin inserted into the support plate by an axle pin located at an upper part of the support plate, and as the piston actuates to move the cleaning car the support plates move to an incline position and causes the brushes to push the solid sludge adhered to the filtering membrane downwards toward the discharge cone of the sludge receiver; and
the incline position of the support plates produces an optimum inclination angle of the brush, and the optimum inclination angle additionally defined by location of the butt adhered to the cleaning blade pair near a lower side of the support plate.

* * * * *